United States Patent
Watten (10) Patent No.: US 6,821,442 B1
(45) Date of Patent: Nov. 23, 2004

(54) METHOD AND APPARATUS FOR CONTROL OF AQUATIC VERTEBRATE AND INVERTEBRATE INVASIVE SPECIES

(75) Inventor: Barnaby Jude Watten, Winchester, VA (US)

(73) Assignee: The United States of America as represented by the Secretary of the Department of the Interior, Washington, DC (US)

( * ) Notice: Subject to any disclaimer, the term of this patent is extended or adjusted under 35 U.S.C. 154(b) by 150 days.

(21) Appl. No.: 10/216,468

(22) Filed: Aug. 12, 2002

(51) Int. Cl.$^7$ .................................................. C02F 1/20
(52) U.S. Cl. ...................... 210/750; 210/764; 210/205; 210/258; 210/259
(58) Field of Search .............................. 210/205, 258, 210/259, 750, 757, 758, 764

(56) References Cited

U.S. PATENT DOCUMENTS

| | | | | |
|---|---|---|---|---|
| 3,251,357 A | | 5/1966 | Williamson | |
| 3,676,983 A | * | 7/1972 | Nold | 96/196 |
| 4,316,725 A | * | 2/1982 | Hovind et al. | 95/248 |
| 5,180,403 A | * | 1/1993 | Kogure | 95/265 |
| 5,192,451 A | * | 3/1993 | Gill | 210/755 |
| 5,376,282 A | * | 12/1994 | Chang | 210/750 |
| 5,578,116 A | * | 11/1996 | Chang | 96/194 |
| 5,591,349 A | * | 1/1997 | Ikeda et al. | 210/760 |
| 5,609,766 A | * | 3/1997 | Schneider et al. | 210/662 |
| 5,932,112 A | | 8/1999 | Browning, Jr. | |
| 6,096,221 A | * | 8/2000 | Kerchouche et al. | 210/696 |
| 6,221,262 B1 | | 4/2001 | MacDonald et al. | |
| 6,267,878 B1 | | 7/2001 | Kerchouche et al. | |

* cited by examiner

Primary Examiner—Duane Smith
Assistant Examiner—Minh-Chau T. Pham
(74) Attorney, Agent, or Firm—Mark Homer (57) ABSTRACT

A method of killing aquatic species in water includes containing the water with the aquatic species therein within a conduit; pressurizing the water; and transferring gas to the water to thereby supersaturate the water with dissolved gas such that $\Delta P$ is greater than zero.

18 Claims, 3 Drawing Sheets

METHOD AND APPARATUS FOR CONTROL OF AQUATIC VERTEBRATE AND INVERTEBRATE INVASIVE SPECIES

STATEMENT OF GOVERNMENT INTEREST

The invention described herein may be manufactured and used by or for the Government of the United States of America for government purposes without the payment of any royalties therefor.

BACKGROUND OF THE INVENTION

The invention relates in general to a method for killing aquatic species and in particular to an environmentally friendly method for killing aquatic vertebrate and invertebrate invasive species.

The introduction of nonindigenous (exotic) species has had dramatic negative effects on marine, estuarine, and freshwater ecosystems in the United States and abroad (Elton, 1958; Mooney and Drake, 1986; Chesapeake Bay Commission, 1995) (Shortened literature citations are given throughout the specification. More complete citations are given at the end of the specification.). Effects include alteration of the structure and dynamics of the ecosystem involved, including extirpation of native species (OTA, 1993). The release of ballast water from ships is a major transport mechanism for nonindigenous aquatic organisms (Carlton, 1985) as recognized by the U.S. National Invasive Species Control Act of 1996 (P.L. 104-332).

Approximately 40,000 major cargo ships operating worldwide (Stewart, 1991) pump ballast water on board to ensure stability and balance. Large vessels can carry in excess of 200,000 $m^3$ of ballast which is released in varying amounts at or when approaching cargo loading ports. In 1991, U.S. waters alone received approximately 57,000,000 metric tons of ballast water from foreign ports (Carlton et al. 1994). Ship surveys have demonstrated that ballast water is in general a non-selective transfer mechanism—many taxa representing planktonic and nectonic organisms capable of passing through coarse ballast water intake screens are common. These include bacteria, larval fish and bloom forming dinoflagellates (Chu et al., 1997; Carton and Geller, 1993; Gail and Halsmann, 1997). The diversity of biota in ballast water is reflected in the examples of shipborne introductions of exotic species in the United States shown in Table 1 (NRC, 1996).

TABLE 1

Examples of Shipborne Introductions in the United States since the 1970s

| Species | Origin | Location |
|---|---|---|
| Jellyfish (Hydromedusae) | | |
| Maeotias inexspectata Black Sea Jellyfish | Black Sea | Chesapeake Bay San Francisco Bay |
| Blackfordia virginica Black Sea Jellyfish | Black Sea | Chesapeake Bay San Francisco Bay |
| Water Fleas (Cladocera) | | |
| Bythotrephes cederstroemi Spiny water flea | Europe | Northeastern North America |
| Copepods (Copepoda) | | |
| Limnoithona sinensis | China | San Francisco Bay |
| Oithona davisae | Japan | San Francisco Bay |
| Sincalanus doerrii | China | San Francisco Bay |
| Pseudodiaptomus marinus | Japan | San Francisco Bay |
| Pseudodiaptomus inopinus | Asia | Columbia River |
| Pseudodiaptomus forbesi | China | San Francisco Bay |
| Crabs (Decapoda) | | |
| Hemigrapus sanguineus Japanese short crab | Japan | Massachusetts to Virginia |
| Mussels, Clams, and Snails (Mollusca) | | |
| Dreissena polymorphia Zebra Mussel | Eurasia | Eastern North America |
| Dreissena bugensis Quagga Mussel | Eurasia | Eastern North America |
| Perna perna South American Mussel | South America | Gulf of Mexico |
| Potamocorbula amurensis Asian clam | China, Japan | San Francisco Bay |
| Philine auriformis New Zealand Seaslug | New Zealand | California |
| Moss Animals (Bryozoa) | | |
| Membranipora membranacea Kelp bryozoan | Europe | Gulf of Maine to New York |
| Fish (osteichthyes) | | |
| Neogobius melanostomus Round goby | Eurasia | Great Lakes |
| Proterorhinus marmoratus Tubenose goby | Eurasia | Great Lakes |
| Gynocephalus cernuus Ruffe | Europe | Great Lakes |
| Mugiligobius parvus Philippine Goby | Phillipines | Hawaii |

Zebra mussel (*Dreissena polymorpha*) and Asian clam (*Corbicula fluminea*) introductions are of particular concern given their ability to (1) rapidly cover and change the physical structure of hard submerged substrates; (2) reduce open phytoplankton biomass and hence change desirable pelagic food webs; and (3) act as major macrofouling species of water intake structures used in municipal, agricultural, industrial, and power station water systems (Morton, 1987; Effler, 1994; O'Neill and MacNeill, 1991; Strayer, 1991; MassIsaac et al., 1991).

With regard to (3) above, the flow of water through the intakes carries with it a continuous source of food and oxygen for the organisms and carries away their wastes while the structures themselves protect the mussels from predation and environmental conditions such as wave activity and scouring by ice. Thus, the presence of the mussels and clams not only leads to reduced water pumping capacity but also can act as a seed source for downstream reaches of the water course involved. Control typically involves manual scraping and use of either thermal treatment or biocides (O'Neill, 1996). The biocides used include chlorine, quaternary and polyquatenary ammonium compounds or aromatic hydrocarbons (Waller et al., 1996).

Asian clams are found in 36 of the contiguous states of the United States as well as in Hawaii. Control of this species has been estimated in 1986 to cost the U.S. power industry over one billion dollars per year. The zebra mussel, introduced into the U.S. in 1986, has spread rapidly throughout the Great Lakes, St. Lawrence River, and waterways associated with the Mississippi River. It is expected that the mussels will, within 20–25 years, infest most areas south of Central Canada and north of the Florida Panhandle from the Pacific Coast to the Atlantic Coast. As the zebra mussel advances, the prognosis for native freshwater bivalve populations is bleak, especially for those populations of species considered threatened and endangered—zebra mussel densities of up to 400,000/m² have been reported and are thought to be the primary cause of the decline in unionids in the Great Lakes (MassIsaac et al., 1991).

A projected cost of two billion dollars has been proposed for zebra mussel control over the decade of the 1990's in the Great Lakes with this figure rising exponentially for North America as the mussels continue to expand their range. Expansion is also expected to dramatically increase the molluscicide load carried by our continental river systems. This is already a concern in the Mississippi River drainage and will no doubt lead to stricter future regulation of molluscicide usage at the local, state, and federal levels. Hence, there is a need for the development of alternative, environmentally neutral technologies to control exotic species already imported as well as to eliminate future ballast introductions of exotic species.

The National Research Council (1996) has identified some methods for shipboard treatment of ballast water. They are:

A. Filtration Systems

These systems cause the physical separation and removal of organisms above a certain size through use of deep media filters, coarse and fine strainers and continuously cleaned microscreens. In some cases, flow-through centrifugation systems are used to separate large particles prior to filtering to reduce filter clogging.

B. Biocides

Oxidizing biocides, such as chlorine, can be added to the ballast water by metering concentrated gas or solid chemicals or they can be generated electrically from sea water. Effective biocide concentrations are typically in the range of 1 to 5 mg/l. Non-oxidizing biocides can also be applied such as glutaraldehyde-based chemicals used in industrial water treatment.

C. Thermal Treatment

Inactivation of organisms in ballast water can be achieved by water heating directly through use of waste heat from ship propulsion systems. Ballast water would need to be heated to temperatures in the range of 35° C. to 45° C. and maintained there for a set period of time.

Additional options for treatment with possible limited applications include electric pulse and pulse-plasma processes, and ozonation. O'Neil (1996) reviews methods used to control zebra mussel colonization in water conduits including power plant cooling systems. They are:

D. Mechanical Controls

Scraping, "pigging", high-pressure water jetting and abrasive blast cleaning is used to dislodge mussels and their bysal threads allowing for disposal. A prerequisite for mechanical removal is that the facility can withstand some level of infestation before the impacts of fouling to become too great.

E. Oxygen Deprivation (Hypoxia)

Zebra mussels can be killed by hermetically sealing water lines and allowing oxygen consumption of the fouling organisms to drop dissolved oxygen concentrations below that required to support their metabolic requirements. Oxygen deprivation works best at high water temperatures. Conduits must be taken out of service for treatment—up to 17 days at cold water acclimation temperatures.

F. Thermal Treatment

The periodic flushing of lines with heated water is most easily accomplished when the facility uses raw water for cooling purposes such as in power plant operations. Here, waste heat is available to offset the high cost of heating water up to the required 31–37° C. Thermal tolerance increases with increased acclimation temperature and decreases with increasing shell length.

G. Exposure and Desiccation

When back-up lines are available, raw water lines can be shut down for prolonged periods of time and drained to expose and desiccate attached zebra mussels. Exposure may be done at non-freezing or freezing temperatures.

H. Chemical Control

Chemical control includes use of agents that have a toxic effect on the mussels (e.g., metallic ions, copper sulfate) and compounds that oxidize the mussel's bodies and also act in a toxic manner (e.g., chlorine, chlorine dioxide, ozone, potassium permanganate, chloramines and bromine). Chemical control strategies may be applied annually, periodically, intermittently, semi-continuously, or continuously. Required exposure periods vary with the agent, and its concentration as summarized by O'Neill (1996). 1. Ultraviolet Irradiation Adult mussels are more resistant to ultraviolet radiation than are veligers given that their shells are opaque. Therefore, this technique is more appropriate for mussel larvae when present in waters of low turbidity Some patents that address the control of zebra mussels and other fouling exotics in water conduit and tank systems are:

In U.S. Pat. No. 6,221,262 (2001) MacDonald et.al. disclose a method for treating ship ballast water that reduces the concentration of dissolved oxygen and/or carbon dioxide while also adding an anti-oxidant.

In U.S. Pat. No. 6,183,646 (2001) Williams et.al. disclose a method for preventing biofouling based on application of filtration units, an oxidizing agent such as chlorine, and the addition of copper ions.

In U.S. Pat. No. 6,171,508 (2001) Wilson discloses a method and apparatus for treating ballast water that uses oxygenation and deoxygenation steps. Deoxygenation is achieved in a selected vacuum tank outfitted with agitators.

In U.S. Pat. No. 5,932,112 (1999) Wilson discloses a method and apparatus for killing microorganisms in ship ballast water prior to its discharge into coastal waters. Following an oxygenation step, ballast water is deoxygenated under vacuum and with agitation.

In U.S. Pat. No. 5,578,116 (1996) Chang discloses a method and apparatus for controlling zebra mussels in water conduits. Conduits are adapted to maintain an air space in contact with water flowing in the conduit and a vacuum is applied so as to reduce dissolved oxygen levels below those needed to support respiration requirements.

In U.S. Pat. No. 5,948,279 (1999) Chang and Bartrand disclose a method and apparatus for controlling macrofoulers in on-demand water conduits. A vacuum device is adapted to produce oxygen-depleted water both with and without water moving though the conduit.

In EPO Patent 00482813 (1991) Muia and Donlan disclose a method for controlling zebra mussels that mixes the biocyde dimethyl ammonium halide with water.

In contrast to the above-discussed methods, the present invention includes an apparatus and method that uses an inexpensive and safe waste gas (for example, $CO_2$ or combustion exhaust) to control exotics by exploiting animal sensitivity to gas supersaturation. Therefore, the use of traditional chemicals or biocides, such as chlorine, can be eliminated, along with the risk and negative environmental effects associated with their use. Further, required exposure periods are minimized thereby allowing reduced water conduit down times and more frequent (preventive) treatment. Thermal treatment is effective but has an excessive energy requirement given the high specific heat of water. Mechanical controls are labor intensive and require some degree of fouling. Oxygen deprivation treatments require extended treatment periods and a biochemical oxygen demand that may not meet requirements. Ultraviolet irradiation cannot be used in closed conduits and is not effective when treating waters with high turbidity.

SUMMARY OF THE INVENTION

The principle utility of the invention lies with its unique capability to cause mortality, at an accelerated rate, of target aquatic invasive species by exploiting their sensitivity to supersaturated concentrations of gases such as carbon dioxide, air, power plant (coal, oil, gas) exhaust gas or a combination of these gases. The method is economical, environmentally safe and applicable to both freshwater and marine waters. Use of the invention is particularly attractive in controlling major macro fouling species of ship ballast tanks and water intake structures/conduits supporting municipal potable water, agricultural, industrial and power station raw water systems.

The present invention exploits the sensitivity of aquatic species to elevated dissolved gas concentrations established through application of gas absorption equipment. Gas stripping equipment is used to remove elevated dissolved gases from treated water prior to release.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE PREFERRED EMBODIMENTS

Definition: As used in the specification and claims herein, the word "conduit" includes a channel or pipe for conveying water or other liquid, all manner of tanks including ship ballast tanks, and water intake structures such as those supporting municipal potable water, agricultural, industrial and power station raw water systems.

Lindinger et al (1984) established that normoxic—hypercapnic seawater effects the cellular metabolism of the mussel *Mytilus edulis*—increases in $P_{CO_2}$ reduced hemolymph pH accelerating shell dissolution rates. Elzinga and Butzlaff (1994) reported elevation of $P_{CO_2}$ induces a narcotizing effect on Asian clams at a concentration of 100 mg/l and toxicity at a concentration of 500 mg/l. The $LC_{50}$ values they established for zebra mussels at 48 h and 96 h were 196 and 74 mg/l (18° C.) and 290 and 81 mg/l (22° C.), respectively. Effects of $P_{CO_2}$ treatment were size dependent with the 1–5 mm size class less vulnerable to treatment than the 6–10 mm and 11–15 mm size classes tested. Sub-lethal narcotizing effects were induced after only short (4-h) exposure periods as indicated by a gaping response. More recently McMahon et al (1994) subjected zebra mussels and Asian clams to hypercapnic, anoxic and normoxic water at 25° C. Here, a $P_{CO_2}$ of 38 torr resulted in detachment of byssal threads and inhibition of byssal thread formation. Elevating $P_{CO_2}$ to 75 torr resulted in complete mortality of zebra mussels ($LT_{50}$=78 h). Survivorship (h) was correlated to shell length:

$$\ln(\text{hours survived}) = 6.47 - 0.116 \text{ (shell length, mm)} \quad (1)$$

Exposure of mussels and clams to a $P_{CO_2}$ of 760 torr (anoxic) reduced the range of $LT_{50}$ values to between 26.0 to 40.3 h. These data suggest carbon dioxide alone or in combination with other gases can be used as an environmentally neutral molluscicide and that required exposure periods can probably be reduced further by elevating $P_{CO_2}$ above atmospheric pressure (760 torr). This will require elevation of the mole fraction of carbon dioxide in the gas phase and use of gas-liquid contacting pressures ($P_T$) that exceed atmospheric pressure—the saturation concentration of a gas in solution ($C^*$) is determined by its partial pressure in the gas phase ($P_i$), liquid temperature and liquid composition as related by Henry's law. In equation form (Colt, 1984):

$$C^* = BK1000 \left( \frac{X(P_T - PH_2O)}{760.0} \right) \quad (2)$$

Partial pressure ($P_i$) is the product of total pressure ($P_T$) and gas phase mole fraction (X) following Dalton's Law:

$$P_i = (P_T)(X) \quad (3)$$

The increase in $C^*$ achieved through elevation of $P_i$ also serves to accelerate the rate of gas transfer thus minimizing gas-liquid contacting equipment scale, i.e., the rate at which gas transfer occurs is proportional to the difference between the existing (C) and saturation concentration ($C^*$) of the gas in solution. In differential form, the relationship is expressed as (Lewis and Whitman, 1924)

$$\frac{dc}{dt} = (K_L a)_T (C^* - C) \quad (4)$$

The overall mass transfer coefficient ($K_L a$) reflects the conditions present in a specific gas-liquid contact system. Conditions of importance include turbulence, waste characteristics of the liquid, the extent of the gas-liquid interphase and temperature. Values of $K_L a$ increase with temperature (degrees C.) as described by the following expression (APHA, 1975):

$$(K_L a)_T = (K_L a)_{20} (1.024)^{T-20} \quad (5)$$

Although each gas species in a contact system will have a unique value of $K_L a$, it has been established that relative values for a specific gas pair are inversely proportional to their molecular diameters (Tsivoglou et al., 1965):

$$(K_L a)_1 / (K_L a)_2 = (d_2/d_1) \quad (6)$$

If the total dissolved gas pressure (TGP) achieved with multicomponent ($CO_2$, $N_2$, $O_2$) gas transfer exceeds the sum of local barometric pressure (BP) and hydrostatic pressure (HP) the water is then supersaturated with one or more gas species, i.e., ΔP is positive where ΔP is defined as:

$$\Delta P = (P_{O_2} + P_{N_2} + P_{Ar} + P_{CO_2} + P_{H_2O}) - BP - HP \quad (7)$$

Excessive ΔP values can result in gas bubble trauma. The pathology of this disease includes the formation of gas emboli and emphysema in blood and tissues, with associated physiological dysfunctions such as homeostasis (Weitkamp & Katz, 1980; Bouck, 1980). Gas bubble trauma is generally considered undesirable, given linked reductions in growth and increases in mortality (Thorn et al., 1978; Krise, 1991). Sensitivity to ΔP will vary with species, life stage, exposure period and other conditions including the relative partial pressures of the dissolved gases present (Rucker, 1976). Deliberate elevation of ΔP through transfer of $CO_2$ or other gases into water may then provide a second (concurrent) method of inducing mortality of zebra mussels, asian clams, or other exotic species including fish.

Malouf et al. (1972) reported on the occurrence of gas-bubble disease in three species of bivalve molluscs, *Crassostrea virginica, C.gigas* and *Mercenaria mercenaria*. In addition to mortality, signs of the disease included conchiolin blisters on mantle edges that tended to displace mantle and gill tissues. Bubbles also formed within gill filaments and outer layers of the mantle tissues. The *M. mercenaria* tested were less sensitive to ΔP but did exhibit a change in gill color due to the presence in the gill of trapped gas bubbles that prevented free circulation of the blood. Goldberg (1978) reported gas bubble disease induced in the surf clam (*Spisula solidissima*) and the bay scallop (*Argopecten irradians*) resulted in mortality, gill tissue damage, gas emboli, membranous tissue blisters, abnormal secretion of shell material and reduced fecal production. Blister formation within *S. solidissima* caused in some cases a buoyancy that floated many of the test animals. Bisker and Castagna (1985) observed similar signs of gas bubble disease in the coot clam (*Mulinia laleralis*), the soft shell clam (*Mya arenaria*) and *M. mercenaria* at total gas saturation (TGP) levels of 108%, 114% and 115%, respectively.

In a later study, Bisker and Castagna (1987) measured reductions in growth and increases in mortality of the scallop *Argopecten concentricus* and the oyster *C. virginica* with TGP=116%.

All bivalve tests were conducted without inducing short term changes in water or barometric pressure. Rapid changes in these pressures can promote gas bubble formation in tissues (fish) and hence enhance the toxicity of a given level of TGP (Tsvetkov et al., 1971; McDonough and Hemmingsen, 1985). This approach has been used with some success to induce mortality in slime molds and several protozoans (Hemmingsen, 1982; Hemmingsen, 1986) but bacteria and yeast are tolerant of the treatment (Hemmingsen and Hemmingsen, 1979).

Sources of carbon dioxide needed for elevation of $P_{CO2}$ include commercial bulk liquid, combustor/furnace exhaust streams, and fermentation. Coal fired electric generating stations, for example, release 6600 kg of $CO_2$ for each metric ton (2000 kg) of coal burned. The resultant mole fraction of $CO_2$ in the stack gas is high (0.14) and valuable. Stack gas may also contain sulphur dioxide which when transferred into water, along with $CO_2$, will form sulfurous acid:

$$SO_2 + H_2O = H_2SO_3 = H^+ + HSO_3^- \quad (8)$$

Hence a corresponding reduction in pH may then provide a third (concurrent) method of inducing mortality of zebra mussels or other exotic species through gas transfer, e.g., the pH threshold for survival of zebra mussel adults is 6.5 and for larvae 6.9 (McCauley and Kott, 1993; Mackie and Kilgour, 1993).

The invention disclosed here causes death of target species through continuous or intermittent exposure to supersaturated concentrations of carbon dioxide, air, combustion exhaust gas or a mixture of these gases when ΔP>0. Exposure is established directly in the water line or tank of concern or in a pretreatment vessel used as a source of water for ship ballast. In all applications hydrostatic pressure or pressure provided by a pump is used to establish conditions needed to add gases to and to maintain gases in solution during the treatment process.

For example, in raw water systems valves are added to the intake and discharge end of the conduit undergoing treatment. Closing these valves establishes a pressure vessel that allows for gas absorption at positive gage pressures. This in turn allows for TGP's that exceed the local BP, i.e., ΔP is positive. Supersaturation of the water with gas is achieved with absorption equipment also designed to operate at positive gage pressures. Equipment of this type includes packed columns, spray columns, side-stream injectors, U-tubes, down-flow bubble contactors and enclosed surface agitators as described by Watten (1994). Factors influencing the performance of these systems include environmental conditions such as temperature, barometric pressure, dissolved organics (alpha and beta factors), salinity and raw water dissolved gas concentrations. Important engineering variables include reactor type, effective mass transfer coefficient ($K_L a$), power input, operating pressure and gas feed rates (Watten, 1994).

During the treatment (exposure) period tissue, blood and hemolyph is supersaturated with dissolved gas (ΔP>0). Supersaturated concentrations of carbon dioxide cause stress and death (narcosis, reductions in blood or hemolyph pH, hypoxia, gas bubble disease). Gas bubble disease can be encouraged by an induced or short term release of pressure from the pressurized contact chamber. This acts to promote formation of gas emboli and therefore reduce required treatment duration.

Further, when coal combustion exhaust gas is transferred to the water, sulphur dioxide assists $CO_2$ in lowering pH to toxic levels by reacting away alkalinity:

$$SO_2 \text{ (gas)} + CaCO_3 \text{ (solid)} = CaSO_3 \text{ (solid)} + CO_2 \text{ (gas)} \quad (9)$$

At equilibrium, the Henderson Hasselbach equation can be used to predict changes in pH resulting from alkalinity reduction when the dissolved carbon dioxide concentration is known:

$$pH = pK_1 - \log\left[\frac{(CO_2)}{(HCO)}\right] \quad (10)$$

Where $pK_1$ is the negative log of the disassociation constant, concentration is in moles/L and $HCO_3$ represents alkalinity. Inspection of Equation (10) reveals pH sensitivity to carbon dioxide concentration increases as alkalinity decreases. Hence, gas dosing requirements will be reduced when testing water of relatively low alkalinity. Upon completion of the selected exposure period, water is pumped out of the contact chamber or displaced by raw water entering the chamber, then degassed to provide a ΔP less than or equal to 0, and carbon dioxide below toxic concentrations.

Factors influencing the design and performance of atmospheric pressure and vacuum degassing equipment are well known in the art. Atmospheric pressure systems allow for the concurrent transfer of oxygen from air into the treated water to replace that lost during treatment by respiration or that lost during formation and release of carbon dioxide bubbles. Bubble formation (effervescing) occurs following use of the short term pressure release step particularly when TGP>110%. Carbon dioxide removed from the treated water during degassing can be captured as a carbon dioxide rich gas and used in a pressurized gas absorber to treat a second water conduit or vessel system. The carbon dioxide concentration (mole fraction) in the off-gas will rise with dissolved carbon dioxide tensions and decrease with stripper air exchange rates (Watten et al, 1994)

Acceptable levels for carbon dioxide, oxygen and $\Delta P$ are given in Table 2 for treated water released into the aquatic environment. Additionally, post treatment of water may include pH adjustment to within the range of 6.5–9.0 if residual sulfurus acid is present following use of combustion exhaust gas. The adjustment of pH is made through addition of one or more base reagents such as sodium hydroxide, hydrated lime or limestone. All post treatment steps may be delayed by routing treated water, preferably under pressure, through alternate water conduits or vessels needing treatment, i.e., reusing water with elevated dissolved gas concentration so as to improve process economics.

TABLE 2

Dissolved gas Criteria for Fish (Colt et al. 1991)

| Parameter | Conditions | |
|---|---|---|
| | Cold water (12° C.) | Warm water (25° C.) |
| DO (low) | 5–6 mg/L | 3–4 mg/L |
| DO (high) | 21 mg/L | 16 mg/L |
| $T_{O2}$ (high) | 300 mm Hg | 300 mm Hg |
| DC (high) | 20 mg/L | 20 mg/L |
| $\Delta P$ (high, all life stages) | 10 mm Hg | 20 mm Hg |
| $\Delta P$ (high, specific life stages) | | |
| eggs | 45 mm Hg | * |
| sac fry | 35 mm Hg | 20 mm Hg |
| early juveniles | 10 mm Hg | 50 mm Hg |
| advance juveniles | <30 mm Hg | * |

DO = dissolved oxygen;
$T_{O2}$ = oxygen tension;
DC = dissolved $CO_2$;
$\Delta P_2$ = TGP – BP
*Unknown In general, the invention includes a method of killing aquatic species in water comprising containing the water with the aquatic species therein within a conduit; pressurizing the water; and transferring gas to the water to thereby supersaturate the water with dissolved gas such that $\Delta P$ is greater than zero. The transferred gas may consist only of carbon dioxide or may comprise a mixture of one or more of carbon dioxide, air, and exhaust gas (containing sulfur dioxide) from fossil fuel combustion.

Figure 1:
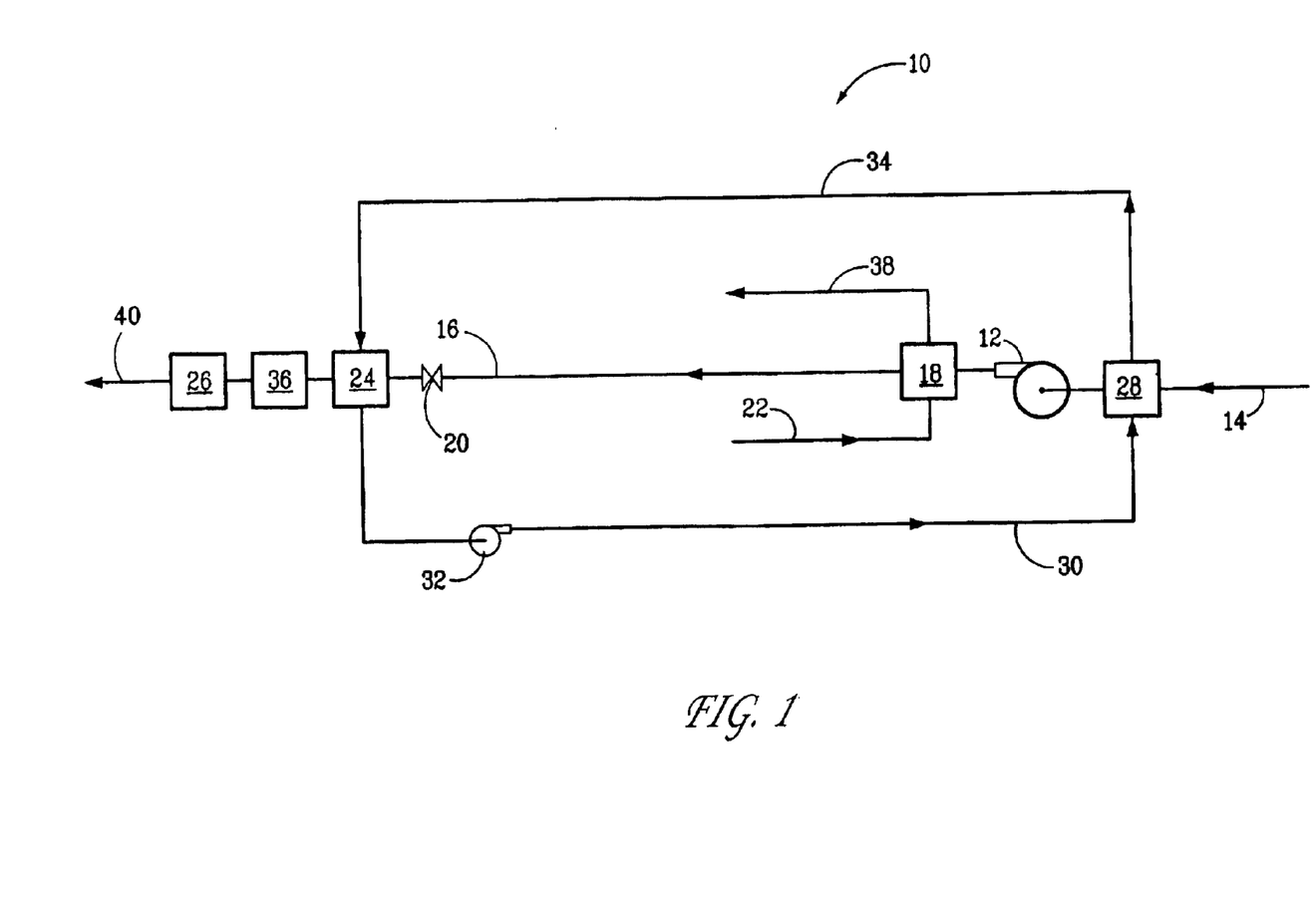
FIG. 1 schematically shows a first embodiment of an apparatus according to the invention.

FIG. 1 schematically shows a first embodiment 10 of an apparatus according to the invention. FIG. 1 shows process components used when treating an on-line water conduit or tank 16. Treatment can be continuous or intermittent. In operation, water is first directed through components used to establish and maintain the dissolved gas concentrations needed to cause mortality of target organisms. Water from a water supply 14 is directed through pretreatment gas absorber 28 and then pumped by pump 12 into gas absorber 18. The water then passes through a pressure reduction valve 20. Dissolved gas is removed from solution first in a gas stripper 24 coupled to pretreatment gas absorber 28 via line 30, and then by a gas stripper 36 vented to the atmosphere. If needed, the water is then directed through a pH control unit 26 used to elevate the pH of water containing excessive sulfurous acid residuals.

Following completion of a target species dependent exposure period, the pressure reduction valve 20 is opened and gas flows to both gas absorbers 28, 18 are terminated. Depressurization encourages development of gas bubble disease. After a suitable delay the gas stripper 36 and pH control unit 26 are also shut down. The process is repeated on an as needed basis. The pH control unit 26 discharges to a treated water release 40.

The apparatus 10 allows for the reuse of $CO_2$ captured from system water to minimize carbon dioxide supply requirements and maximize water pH (Equation 10). The $CO_2$ pretreatment absorber 28 accelerates gas absorption by exposing the water to a gas with a partial pressure of $CO_2$ that exceeds dissolved carbon dioxide tensions in the incoming raw water and by establishing gas-liquid interfacial area needed for gas transfer. For example, exposing water to 50% $CO_2$ gas mixture ($X_{CO_2}$=0.5, Equation 2) can increase the carbon dioxide saturation concentration (C*, Equation 2) by a factor of 2860.

It is understood that gas-liquid interfacial area can be created by a number of reactor-types, stages, and that the gas-liquid contacting can take place at pressures above, at or below local atmospheric pressure. Following the pretreatment absorber 28, raw water is forced by a pump 12 through the gas absorber 18. In the gas absorber 18, the raw water is exposed at positive gage pressures to gas enriched with $CO_2$ thereby allowing for high required dissolved gas tensions. Carbon dioxide, air, combustion gas or a combination thereof are supplied to the absorber 18 via gas supply line 22. Gas absorber 18 includes an off-gas bleed 38 that routes excess gas to the atmosphere, a storage tank or a recycle line. The water pressure is fixed by the pump 12 design, head loss in the conduit or tank 16 to be treated, the setting of the pressure reduction valve 20 and elevation changes that occur prior to release into the gas stripper 24 used to recover carbon dioxide.

As the water exits the pressure reduction valve 20, degassing of $CO_2$ is made possible by the concurrent reduction in C* (Equation 2) and associated establishment of a (C*–C)<0 (Equation 4). Water entering the gas stripper 24 used for $CO_2$ recovery is exposed to a carrier gas such as air that is used to pick up and carry away carbon dioxide released from solution. The carbon dioxide enriched gas is routed through a closed conduit 30 to preclude dilution of the carbon dioxide with the surrounding atmosphere. Upon entering the carbon dioxide pretreatment absorber 28, the carbon dioxide concentration in the carrier gas is reduced as the carbon dioxide is transferred into the inflowing raw water. The carbon dioxide lean gas mixture exiting the absorber 28 is routed back via a return line 34 to the carbon dioxide stripper 24 to pick up additional carbon dioxide. Gas flows between the absorber 28 and stripper 24 may be forced with a blower, compressor or fan 32. Gas absorber 28 and stripper 24 performance is influenced by gas circulation rates.

For example, in packed-bed applications air flow rates used for carbon dioxide stripping are often 2–10 times the water flow rate on a volumetric basis. The gas absorber 28 and strippers 24 used are designed to isolate treatment system gases from the atmosphere so as to conserve carbon dioxide although it is understood that some venting may be required to control gas pressure or volume. The degree of recovery of the carbon dioxide from the water being processed can be varied from zero percent to rates approaching one hundred percent depending on equipment design, operating costs and desired dissolved gas concentrations.

Like the gas stripper 24 for $CO_2$ recovery, the final gas stripper 36 acts to remove residual $CO_2$ by establishing gas/liquid interfacial area and a $(C^*-C)_{CO_2}<0$ condition. Air is forced through the stripper 36 to maintain a low $(C^*)_{CO_2}$, then is vented to the atmosphere. The water, now devoid of excess carbon dioxide, may be directed through a pH control unit 26 to dissolve base reagents, such as NaOH, when needed to raise the pH to the desired range of about 6.5–9.0.

EXAMPLE

Gas feed requirements for a given water flow are related to target dissolved gas concentrations, operating pressure, absorber type, inlet gas concentrations, water temperature, water salinity, gas composition and local atmospheric pressure. For example, assume we wish to treat 100 gpm of freshwater (T=15° C., dissolved oxygen=8 mg/l, dissolved nitrogen=15 mg/l, salinity=0 ppt and local atmospheric pressure=750 mm Hg) with pure carbon dioxide gas and a pressurized packed column absorber 28. The absorber 28 is packed with 2 m of 3.8 cm Nor Pac® packing and the off-gas recycle system operates at a 60 percent recovery rate. If we wish to maintain a dissolved carbon dioxide concentration of 1800 mg/l ($P_{CO_2}$=683 mm Hg) the following steps can be used to establish gas feed requirements and required pressure within the packed column (Watten, 1990):

1. Calculate required change in $CO_2$ across the packed column given a recycle efficiency of 0.6.

$$\Delta CO_2=(1-0.6)(1800 \text{ mg/l } CO_2)_{effluent}=720 \text{ mg/l}$$

2. Calculate packed column mass transfer coefficient $(G)_{15°\ C.}$ for the 2 m of 3.8 cm Nor Pac®.

$$(G)_{15°\ C.}=(0.324+1.555(2\ m))1.024^{15-20°\ C.}=3.05$$

3. Using delta $CO_2$ from step 1 and $(G)_{15°\ C.}$ from step 2 calculate the required $C^*$ of $CO_2$ within the packed column.

$$(C^*) = \frac{720 \text{ mg/l}}{1-e^{-3.05}} + (1800-720 \text{ mg/l})$$

$$= 1836 \text{ mg/l}$$

4. The $C^*$ of $O_2$ and $N_2$ are equal to inlet concentrations since we require no change in their concentration. Using Henry's law, calculate gas phase partial pressure ratio's for $CO_2$, $O_2$ and $N_2$ that correspond to the saturation concentration established in Step 3.

$$PP_{CO2}=1836 \text{ mg/l}/970.0 \text{ mg/l}=0.932$$

$$PP_{O_2}=8 \text{ mg/l}/48.93 \text{ mg/l}=0.1635$$

$$PP_{N_2}=15 \text{ mg/l}/21.307 \text{ mg/l}=0.704$$

5. The required absolute pressure within the column can now be calculated using $PP_{O_2}$, $PP_{N_2}$, $PP_{CO_2}$ and water vapor pressure.

$$CP=760\ (0.1635+0.704+0.932)+12.79=1380.4 \text{ mm Hg (26.7 psia)}$$

6. The required molar feed rate of $CO_2$ into the carbonator $(Q_{CO_2})$ can now be calculated given the required delta $CO_2$ from Step 1 and the given raw water flow rate of 100 gpm.

$$(Q)_{CO_2}=(100)\cdot(3.785)(720 \text{ mg/l}/44,000 \text{ mg/mole})=6.2 \text{ moles/min.}$$

Figure 2:
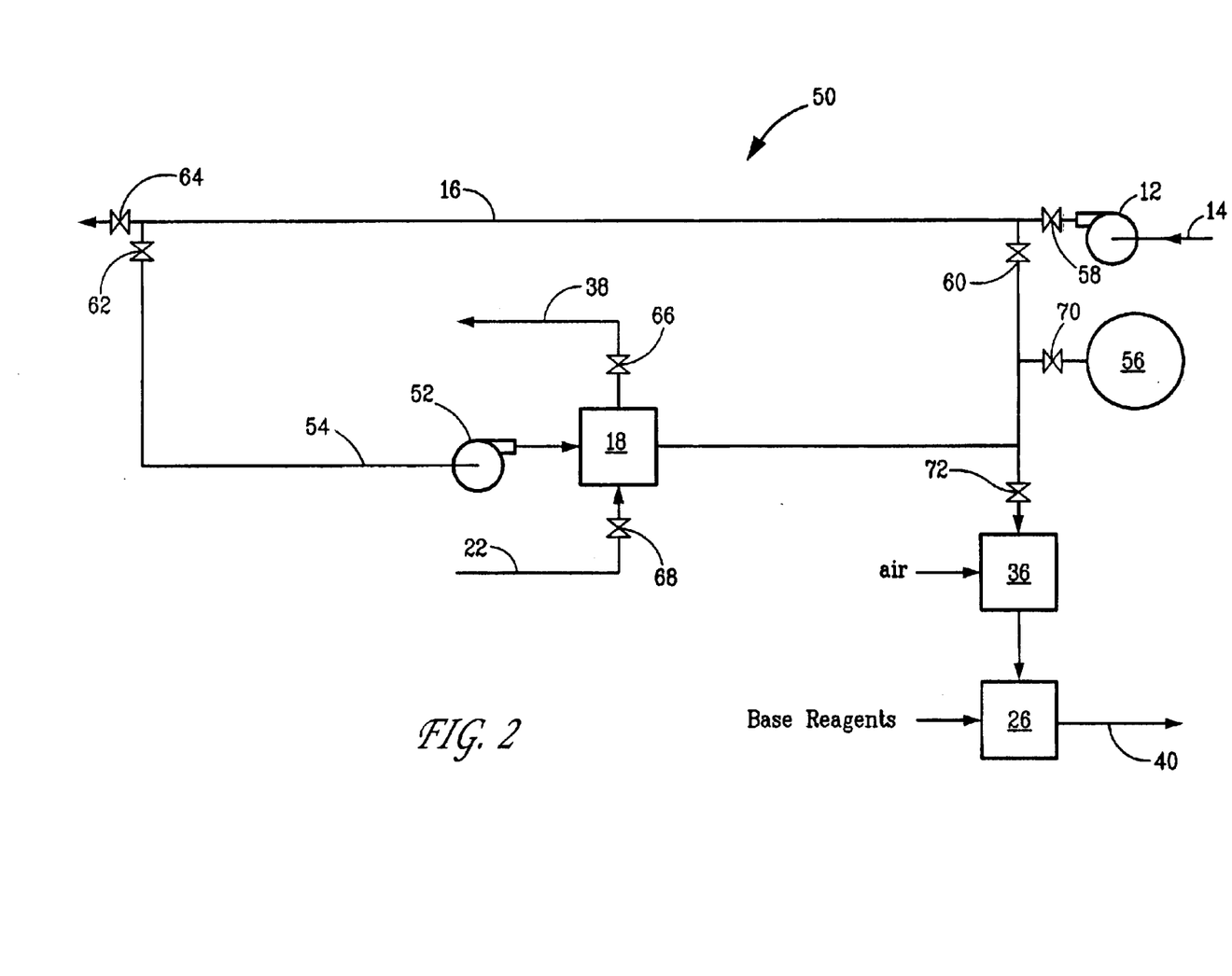
FIG. 2 schematically shows a second embodiment of an apparatus according to the invention.

FIG. 2 schematically shows a second embodiment 50 of an apparatus according to the invention. FIG. 2 shows process components used when a single water conduit or tank 16 can be treated off-line. Here, the raw water supply pump 12 is shut down and the conduit 16 to be treated is isolated by closing valves 58, 64 and 72. This creates a closed treatment recycle loop 54 that can be pressurized by feeding gas into the gas absorber 18. The recycle pump 52 moves the water in the recycle line 54 allowing repeated water passes through the gas absorber 18. This provides for high dissolved gas concentrations, mixing and control over treatment duration. The pressurized water storage tank 56 may be used following the opening of valve 70 to supply water containing high dissolved gas concentrations saved during a previous treatment cycle.

The off-gas bleed 38 can be opened partially during treatment to allow combustion gas to be fed into and then out of the gas absorber 18 to increase the mass of carbon dioxide or sulphur dioxide applied. The off-gas bleed 38 may also be used to decrease dissolved gas pressures following a required treatment period but before water is routed to the gas stripper 36 and pH control unit 26. In the case of pure $CO_2$ additions or when combustion gas is scarce, gas bled from the gas absorber 18 may be stored and used in a second treatment unit.

Water is flushed from the system following treatment by starting the raw water supply pump 12, opening valves 58 and 72, and closing valves 64, 66, 68, and 70. The volume of water released can be minimized by closing valves 62 and 72 and opening valve 64 at the time when raw water has displaced treated water in the water conduit or tank 16 to be treated.

Figure 3:
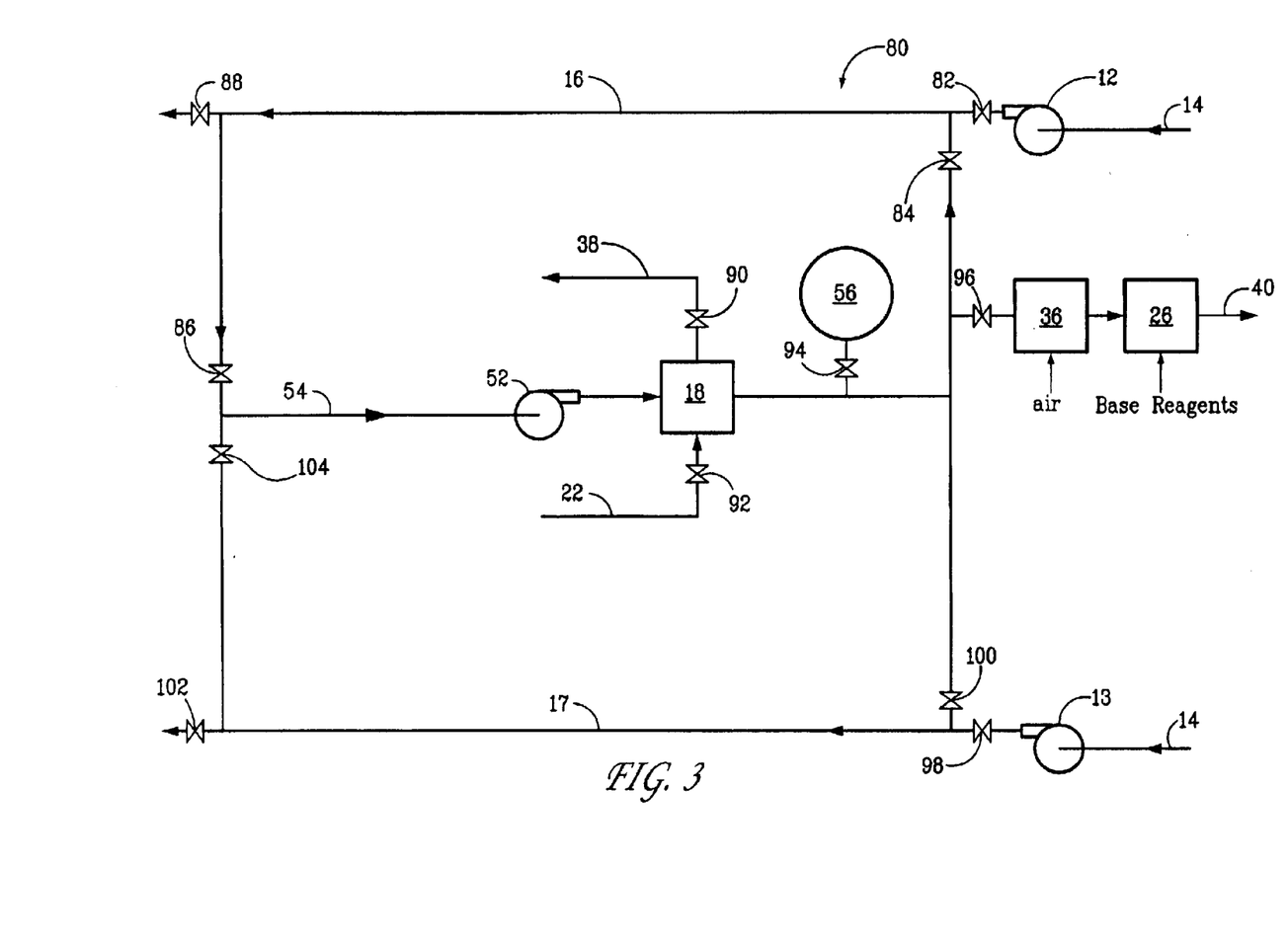
FIG. 3 schematically shows a third embodiment of an apparatus according to the invention.

FIG. 3 schematically shows a third embodiment 80 of an apparatus according to the invention. FIG. 3 shows process components used when one of two conduits or tanks 16, 17 can be taken off-line for treatment using shared process components as defined in FIG. 2. For example, when conduit 16 is in service valves 82, 88 are open and valves 84 and 86 are closed. This isolates the water conduit 17 allowing valves 104, 92, 90, 100 to be opened, the recycle pump 52 to be activated, and gas to flow into the absorber 18.

Following the achievement of a desired dissolved gas saturation level, and exposure period, the recycle pump 52 is shut down, gas flow is terminated and treated water is flushed from the conduit 17. The flushing step is achieved by opening valves 96 and 98 and then starting the raw water supply pump 13. Valves 94 and 100 are closed to minimize raw water requirements. The gas stripper 36 and pH control unit 26 function as described earlier. The process of water conduit or tank isolation, treatment and rinse can be achieved with either side 16, 17 of the system so as to eliminate interruption in service and to allow use of a common set of treatment components.

Gas supersaturation ($\Delta P>0$) with $CO_2$, air or combustion off-gas is established and maintained for a time period shown to cause a selected mortality rate within the population of the target species. We have established $LT_{50}$ values ($LT_{50}$ is defined as the time to kill 50 per cent of a targeted species) for the Asian clam (*Corbicula fluminea*) exposed to elevated concentrations of carbon dioxide and a simulated combustion gas mixture ($O_2$=4.27%; $N_2$=85.7%; $CO_2$=13.6%; $SO_2$=0.284%). The $LT_{50}$ values were established using standard laboratory methods (APHA 1995). With carbon dioxide exposure, $LT_{50}$ was described by the model ($R^2$=0.86):

$$LT_{50}=y+a\ \ln(P_{CO2})$$

Where
   y=683.62
   a=−75.3

$LT_{50}$ values decreased from a high of 270 min at 260 mm Hg $P_{CO2}$ to a low of 90 min at 2070 mm Hg gage pressure. This later value represents a 27 fold decrease in $LT_{50}$ below that established by McMahon et al (1995) at a $P_{CO2}$ of 760 mm Hg (absolute pressure). Combustion gas requires longer exposure periods given a lower $X_{CO2}$. The $LT_{50}$ at a operating pressure of 2070 mm Hg is about 350 min. Complete mortality in both cases is expected at 2.2–3.0×$LT_{50}$ values. Lower levels of $LT_{50}$ are anticipated for fish and other aquatic exotics of concern.

While the invention has been described with reference to certain preferred embodiments, numerous changes, alterations and modifications to the described embodiments are possible without departing from the spirit and scope of the invention as defined in the appended claims, and equivalents thereof.

LITERATURE CITED

The literature cited below is hereby expressly incorporated by reference.

APHA. 1995. Standard methods for the examination of water and wastewater. American Public Health Association, New York.

Bisker, R. and Castagna, M. 1985. The effect of various levels of air supersaturated seawater on *Mercenaria mercenaria* (linné), *Mulinia lateralis* (say), and *Mya arenaria linné*, with reference to gas bubble disease. J. Shellfish Res., 5: 97–102.

Bouck, G. R. 1980. Etiology of gas bubble disease. Trans. Am. Fish. Soc. 109: 703–707.

Carlton, J. T., Reid. D. M. and Leeuwen, H.van. 1994. The role of shipping in the introduction of nonindigenous aquatic organisms to the coastal waters of the United States (other than the Great Lakes) and an analysis of control options. The National Biological Invasions Shipping Study (NABISS). U.S. Coast Guard and National Sea Grant Program.

Carlton, J. T. 1985. Transoceanic and interoceanic dispersal of coastal marine organisms: the biology of ballast water. Oceanogr. Mar. Biol. Ann. Rev. 23: 313–371.

Carlton, J. T. and Geller, J. B. 1993. Ecological roulette: the global transport of nonindigenous marine organisms. Science 261: 78–82.

Chesapeake Bay Commission. 1995. The introduction of nonindigenous species to the Chesapeake Bay via ballast water. Chesapeake Bay Commission, Annapolis, Md. 28p.

Chu, K. H., Tam, P. F., Fung, C. H., and Chen, Q. C. 1997. A biological study of ballast water in container ships entering Hong Kong. Hydrobiologia 352: 201–206.

Colt, J. 1984. Computation of dissolved gas concentrations in water as functions of temperature, salinity and pressure. American Fisheries Society Special Publication 14.

Colt, J., Orwicz, K., and Bouck, G. 1991. Water quality for high density fish culture using supplemental oxygen. Am. Fish. Soc. Symp. 10:372–85.

Effler, S. W. and Siegfried, C. 1994. Zebra mussel (*Dreissena polymorpha*) populations in the seneca river. New York: impact on oxygen resources. Environ. Sci. Technol.

Elton, C. S. 1958. The ecology of invasions of animals and plants. Methuen and Company, Ltd., London. 181 pp.

Elzinga, W. J. and Butzklaff, T. S. 1994. Carbon dioxide as a narcotizing pre-treatment for chemical control of *Dreissena polymorpha*. Proceedings Fourth International zebra mussel conference, March 7–10, Madison, Wis.

Goldberg, R. 1978. Some effects of gas-supersaturated seawater in *Spisula solidissima* and *Argopecten irradians*. Aquaculture, 14:281–287.

Hemmingsen, B. B. 1986. Promotion of gas bubble formation by ingested nuclei in the ciliate, tetrahymena pyriformis. Cell Biophysics 8: 189–199.

Hemmingsen, E. A., and Hemmingsen, B. B. 1979. Lack of intracellular bubble fermation in microorganisms at very high gas supersaturations. J. Applied Physiol. 6: 1270–1277.

Hemmingsen, E. A. 1982. Cinephotomicrographic observations on the intracellular bubble formation in tetrahymena. J. Exp. Zool. 220: 43–48.

Krise, W. F. 1991. Hatchery management of lake trout exposed to chronic dissolved gas supersaturation. American Fisheries Society Symposium, 10: 368–371.

Lewis, W. K. and Whitman, W. C. 1924. Principles of gas adsorption. J. Ind. Eng. Chem. 16: 1215–20.

MacIsaac, H. J., Sprules, W. G. and Leach, J. H. 1991. Ingestion of small-bodies zooplankton by zebra mussels (*Dreissena polymorphia*): Can cannibalism on larvae influence population dynamics? Canadian Journal of Fisheries and Aquatic Sciences 48: 2051–2060.

Mackie, G. L. and Kilgour, B. W. 1993. Efficiency and role of alum in removal of zebra mussel veliger larvae from raw water supplies. Third International zebra mussel conference, February 1993, Toronto.

Matouf, R., Keck, R., Maurer, D. and Epifanio, C. 1972. Occurrence of gas-bubble disease in three species of bivalve molluscs. J. Fish. Res. Bd. Canada 29: 588–589.

McCauley, R. W. and Kott. 1993. Lethal effects of hydrogen ion on adult zebra mussels, *Dreissena polymorpha*, in relation to calcium concentration of the surrounding water. Third International zebra mussel conference, February 1993, Toronto.

McDonough, P. M. and Hemmingsen, E. A. 1985. Swimming movements initiate bubble formation in fish decompressed from elevated gas pressures. Comp. Biochem. Physiology. 81A: 209–212.

McMahon, R. F., Matthews, M. A., Shaffer, L. R. and Johnson, P. D. 1995. Effects of elevated carbon dioxide concentrations on survivorship in zebra mussels (*Dreissena polymorpha*) and asian clams (*corbicular fluminea*). American Zoologist 34: 319–336.

Mooney, H. A. and Drake, J. A. 1986. Ecology of biological invasions of North America and Hawaii. Springer-Verlag, New York. 321 pp.

Morton, B. 1987. Polymorphism in *corbicula fluminea* (bivalvia: corbiculoidea) from Hong Kong. Malacological Review, 20: 105–127.

National Research Council, 1996. Stemming the tide: Controlling introductions of nonindigenous species by ships ballast water. National Academy of Sciences, USA. 129 p.

O'Neill, C. R. and MacNeill, D. B. 1991. The zebra mussel (*Dreissena polymorpha*): an unwelcome north american invader. Coastal Resources Fact Sheet, November 1991, Sea Grant, Cornell Cooperative Extension, State University of New York.

Office of Technology Assessment (U.S. Congress). 1993. Harmful non-indigenous species in the United States. OTA Publication OTA-F-565, U.S. Government Printing Office, Washington, DC.

Rucker, R. R. 1976. Gas bubble disease of coho salmon, *Oncorhynchus kisutch*, in water with constant total gas pressure and different oxygen-nitrogen ratios. U.S. National Marine Fisheries Service Fisheries Bulletin, 73: 915–918.

Strayer, D. L. 1991. Projected distribution of zebra mussel, *Dreissena polymorpha* in North America. Car. J. Fish. Aquat. Sci. 48: 1389–1395.

Thorn, W. L., Lessman, C., and Glazer, R. 1978. Some effects of controlled levels of dissolved gas supersaturation on selected salmonids and other fishes. Minnesota Department of Natural Resources, Section of Fisheries, Investigational Report 347.

Tsivoglou. E. C., O'Connell, R. L., Walter, C. M., Godsil, P. J. and Logsdon, G. S. 1965. Tracer measurements of atmospheric reaeration. 1. Laboratory studies. J. Water Poll. Contr. Fed., 37: 1343–62.

Tsvetkov, V. I., Paulov, D. S. and Nezdoliy, V. K. 1971. Changes in hydrostatic pressure lethal to the young of some freshwater fish.

Waller, D. L., Fisher, S. W. and Dabrowska, H. 1996. Prevention of zebra mussel infestation and dispersal during aquaculture operations. The Progressive Fish-Culturist 58: 77–84.

Watten, B. J. 1990. Design of packed columns for commercial oxygen addition and dissolved nitrogen removal based on effluent criteria. Aquacult. Eng. 9:305–28.

Watten, B. J. 1994. Aeration and Oxygenation. In: Aquaculture water reuse systems: engineering and management., eds M. B. Timmons and T. M. Losordo. Elsevier, Amsterdam, The Netherlands, pp. 173–204.

Weitkamp, D. E. and Katz, M. 1980. A review of dissolved gas supersaturation literature. Trans. Am. Fish. Soc., 109: 659–702.

What is claimed is:

1. A method of killing aquatic species in water, comprising:
    containing the water with the aquatic species therein within a conduit;
    pressurizing the water; and
    transferring carbon dioxide to the water to thereby supersaturate the water with dissolved carbon dioxide such that $\Delta P$ is greater than zero wherein cells of the aquatic species are affected resulting in death of the aquatic species.

2. The method of claim 1 wherein the conduit is one of a ballast tank of a ship and a raw water pipe.

3. The method of claim 1 further comprising maintaining the water with the $\Delta P$ greater than zero for a period of time sufficient to kill a desired percentage of the aquatic species.

4. The method of claim 3 further comprising degassing the water such that $\Delta P$ is less than or equal to zero.

5. The method of claim 4 wherein the degassing step includes removing carbon dioxide below a toxic level.

6. The method of claim 5 further comprising recycling the removed carbon dioxide.

7. The method of claim 5 further comprising adjusting a pH of the water within a range of 6.5–9.0.

8. The method of claim 3 further comprising reducing the pressure of the water.

9. An apparatus for killing aquatic species in water, comprising:
    a pump for pressurizing the water;
    a conduit for holding the pressurized water;
    a pressurized gas absorber for transferring carbon dioxide to the pressurized water to thereby supersaturate the pressurized water with dissolved carbon dioxide such that $\Delta P$ is greater than zero wherein cells of the aquatic species are affected resulting in death of the aquatic species; and
    a gas stripper downstream of the pressurized gas absorber for removing dissolved carbon dioxide from the water.

10. The apparatus of claim 9 wherein the conduit is one of a ballast tank of a ship and a raw water pipe.

11. The apparatus of claim 9 further comprising valves at an inlet and an outlet of the conduit for isolating the conduit.

12. The apparatus of claim 9 further comprising a pH control unit downstream of the gas stripper.

13. The apparatus of claim 12 wherein the pH control unit maintains a pH of the reduced pressure water in a range of 6.5–9.0.

14. The apparatus of claim 9 further comprising a pretreatment gas absorber disposed upstream of the pump for transferring carbon dioxide to the water.

15. The apparatus of claim 9 further comprising a pressure tank for storing supersaturated water having $\Delta P$ greater than zero.

16. The apparatus of claim 14 further comprising a recycle line from the gas stripper to the pretreatment gas absorber.

17. The apparatus of claim 16 further comprising a second gas stripper disposed downstream of the gas stripper and vented to the atmosphere.

18. The apparatus of claim 9 further comprising a pressure reduction valve downstream of the pressurized gas absorber for reducing pressure of the pressurized water.

* * * * *